Sept. 8, 1964     W. J. HARPER ETAL     3,148,088
METHOD FOR TREATING HOLLOW ARTICLES HAVING ONE CLOSED END
Original Filed Aug. 25, 1961     4 Sheets-Sheet 1

FIG. I.

INVENTORS
Willard J. Harper &
Paul A. Hauck
BY
Wilkinson, Mawhinney & Theibault
ATTORNEYS Sept. 8, 1964 W. J. HARPER ETAL 3,148,088
METHOD FOR TREATING HOLLOW ARTICLES HAVING ONE CLOSED END
Original Filed Aug. 25, 1961 4 Sheets-Sheet 3

INVENTORS
Willard J. Harper &
Paul A. Hauck

BY Wilkinson, Mawhinney & Theibault
ATTORNEYS

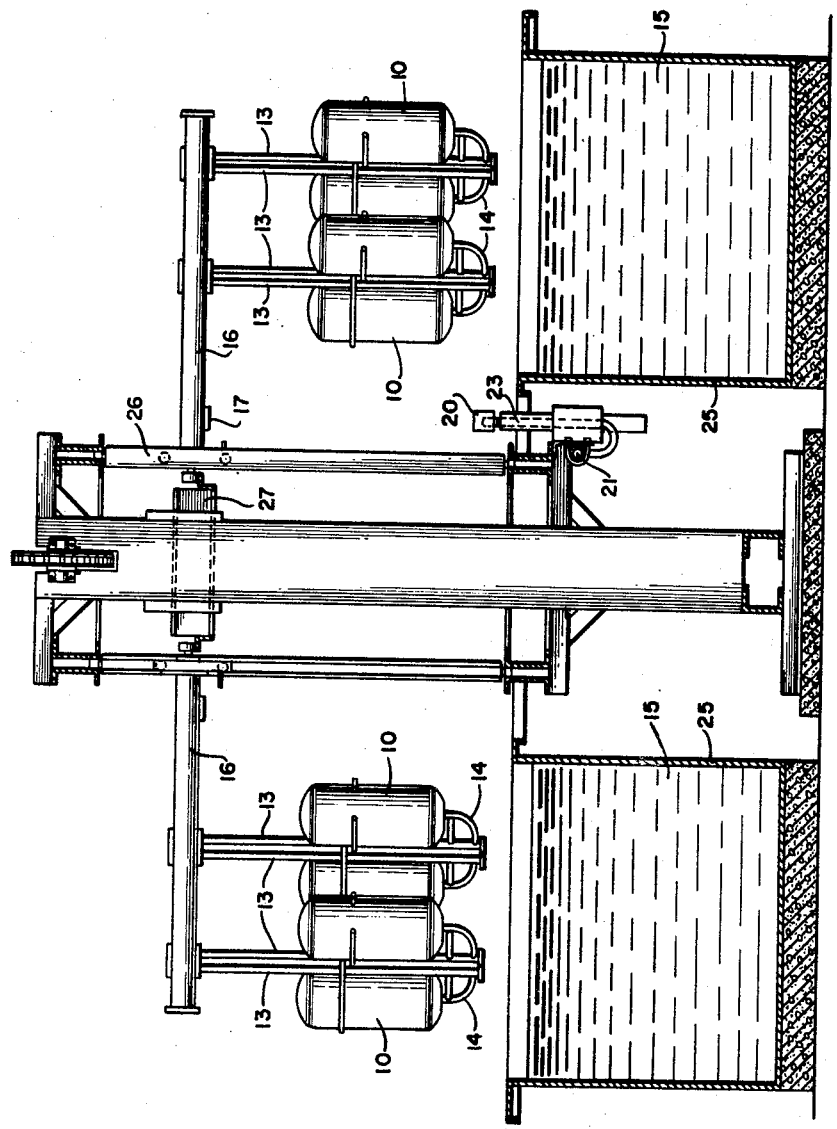

United States Patent Office 3,148,088
Patented Sept. 8, 1964

3,148,088
METHOD FOR TREATING HOLLOW ARTICLES HAVING ONE CLOSED END
Willard J. Harper, Colts Neck, and Paul A. Hauck, Freehold, N.J., assignors to Hanson-Van Winkle-Munning Co., Matawan, N.J., a corporation of New Jersey
Original application Aug. 25, 1961, Ser. No. 134,073, now Patent No. 3,108,605, dated Oct. 29, 1963. Divided and this application Jan. 15, 1963, Ser. No. 251,570
1 Claim. (Cl. 134—22)

The present invention relates to method for treating hollow articles having one closed end and is a divisional of application Serial No. 134,073, filed August 25,1961, now U.S. Patent No. 3,108,605, and relates more particularly to the continuous treatment of said hollow articles having one closed end in which side arms travel along a line of treatment tanks or stations in which the treatment tanks are of both single station and multiple station type and in which the side arms have work carriers which carry hollow articles having a closed end in an inverted position with the closed end uppermost and in which the side arms are lowered toward the treatment tank in a vertical line of motion and in which they are removed from the treatment tank in a similar line of motion.

The elevating and conveying apparatus employed in connection with the present invention does not form any novel part thereof but are well known in the article treatment art and may be similar to that illustrated in the Guerin Todd Patent No. 2,196,131 of April 2, 1940, or the Arthur Friedman Patent No. 2,461,113 of February 8, 1949.

In the handling of hollow articles having a closed end the art has heretofore tilted, inclined, or laid on its side the hollow article and introduced same into the treatment tank. This has resulted in increasing the tank size, that is, increasing is length and width as well as requiring more of the treatment solution.

The present invention makes a maximum utilization of plant floor space, tank size and solution quantity by introducing the hollow article vertically with the closed end up into the treatment solution.

In the embodiment illustrated and described herein by way of example only the hollow article to be treated will be presumed to be introduced into an acid etch solution, which acid must not be spilled or carried over into subsequent solution tanks resulting in contamination of the solutions in the subsequent treatment tanks.

When an inverted hollow article having a closed end is introduced into an acid solution the acid will only rise inside the container until the air trapped within the container is compressed to its maximum limit at which time the article would then float off the carrier and we have eliminated this hazard by providing a U-shaped carrier in which the article to be treated is placed upon the free leg of the U-shaped member which is carried by the side arm of the machine in such a way that the air compressed incident to introduction of the hollow article into the acid solution will escape down the supporting tube up to the carrier arm and be vented to atmosphere.

The second problem which confronts one attempting to immerse a hollow article vertically into a treatment solution is that once the article is totally immersed in the solution, how can the article be vertically raised from the solution without causing the contents to be trapped in the article until the neck or mouth of the article is in contact with atmosphere. This latter problem is overcome by connecting the article member to a source of low pressure air which will impart a blowing action which breaks the vacuum in the closed upper end of the hollow article incident to raising of the article with the solution therein. This low pressure air begins to force the solution from the inverted hollow article as the article is being raised from the treatment solution and once the vacuum seal is broken and the work carrier arm is vented to atmosphere, air will replace the solution and the article will emerge from the treatment solution without a sudden deluge of the acid solution rushing all about the area possibly getting in the eyes of machine operators not to mention the spilling of acid about the premises and on parts of the machine which may be injurious to both humans and equipment.

With the foregoing and other objects in view, the invention will be more fully described hereinafter, and will be more particularly pointed out in the claims appended hereto.

In the drawings, wherein like symbols refer to like or corresponding parts through the several views:

FIGURE 7 is a transverse elevational view having parts broken away and parts shown in section of a continuous type side arm machine, the side arms of which are constructed in accordance with the present invention.

Figure 1:
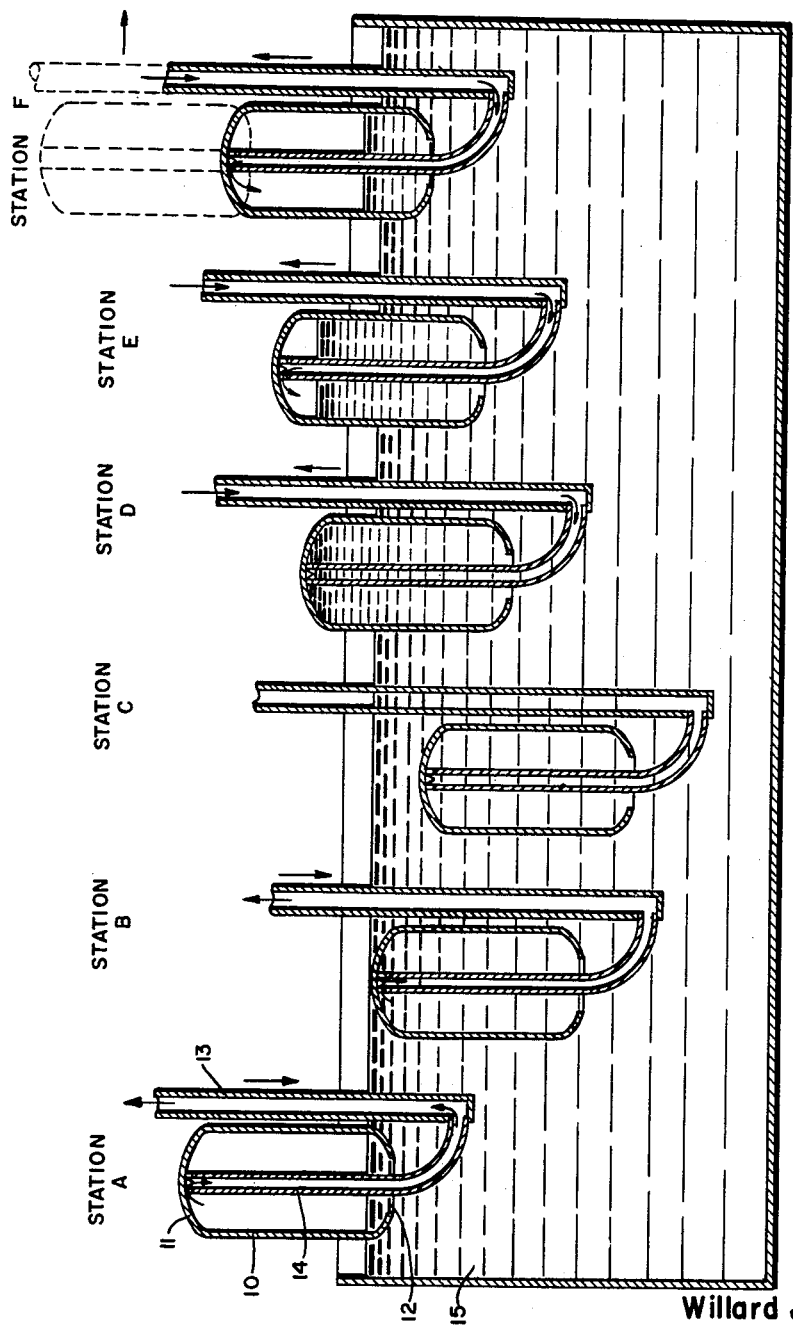
FIGURE 1 is a diagrammatic view showing in cross section a treatment solution and the immersion therein of a hollow article having a closed end in an inverted position carried upon a work carrier constructed in accordance with the present invention and also the emergence of the article from such treatment solution in which six stations depict the various stages of treatment.

Referring now to FIGURE 1, Station A shows an inverted hollow article 10 having a closed end 11 and an open mouth 12. The open mouth 12 is placed downwardly in such a manner that the closed end or bottom 11 rests upon the upper end of a short leg 14 of a generally U-shaped article carrier member having a major or longer leg 13. The members 13 and 14 are hollow. The upper end of the member 14 has cut-away portions to permit air to enter and leave the tube 14 when the bottom of the article is resting upon the free end of the member 14. As the acid treatment solution 15 begins to enter the mouth 12 of the hollow article 10, the air compressed incident to the article 10 being lowered into the solution will enter the tube 14 and be vented to atmosphere through the tube 13 through a hollow side arm to be later described.

Station B shows the hollow article 10 being lowered to treatment level while Station C shows the article completely immersed in the treatment solution while undergoing the treatment cycle.

Upon completion of the treatment cycle when the article 10 is to be removed from the solution as the article is raised in the direction of the arrow, the solution within the hollow article 10 will tend to pull a vacuum and stay within the container. However, as shown at Station E the hollow tubular members 13 and 14 are connected to a low pressure source of air of the order of two or three pounds and that air enters the container breaking the vacuum and commencing forcement of the solution from within the container down into the solution 15 in the treatment tank as the article and its carrying arms continue to rise.

As shown in Station F once the vacuum has been broken and the interior of the hollow article 10 has been placed in communication with outside atmosphere, the weight of the solution pulling down as the container rises will act as a piston within a cylinder pulling air from the hollow side arm through the article carrier into the hollow article 10 whereby upon the hollow article 10 being totally removed from the acid treatment solution 15 all of the acid solution in the hollow article 10 will have been removed without deluging or spilling the acid about the tank.

This cycle is repeated every time the hollow article is introduced into a solution. It will be appreciated that there may be as many as ten to twenty treatment tanks into which the inverted hollow article must be introduced in sequence to achieve a particular predetermined internal surface finish.

One form of machine for carrying out this process may consist of a hollow work carrying side arm 16 having atmosphere openings 17 at one end and being closed at its ends 18 and 19. The U-shaped hollow article carrying members 13 and 14 are in air duct communication with the interior of the hollow side arm 16 in such a manner that when the side arm is in the position shown in FIGURE 2, the opening 17 will be vented to atmosphere and an air path exists between 14, 13, 16, 17 and atmosphere.

Figure 2:
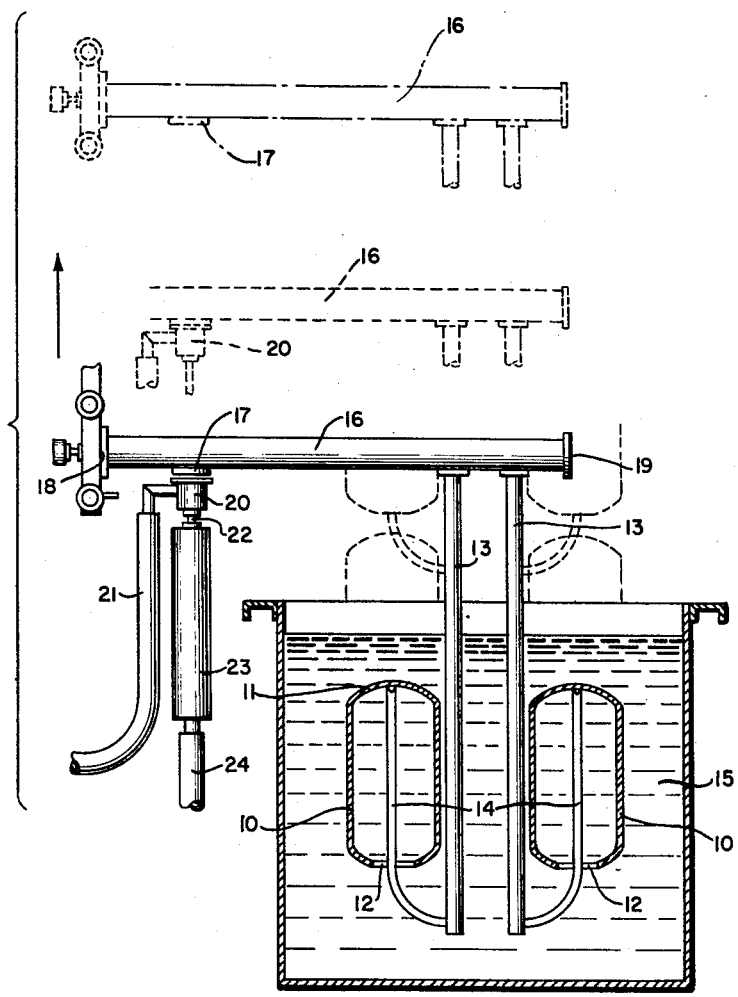
FIGURE 2 is a diagrammatic transverse section having parts broken away and parts shown in section with a work carrier arm in the lower solid line treatment position and raised to a dashed line upper or removed position.
Figure 4:
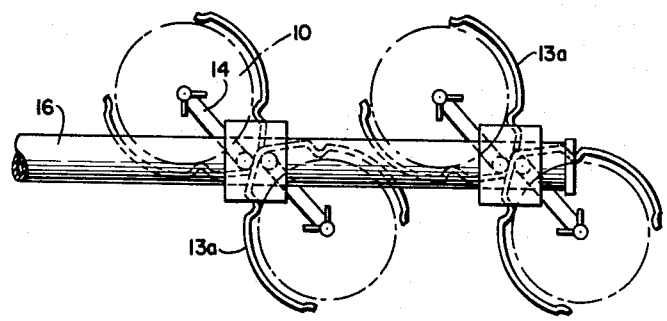
FIGURE 4 is a fragmentary top plan view of FIGURE 3.

When the hollow article 10 is in the fully immersed position shown in FIGURE 2 with its open mouth directed downwardly and the bottom 11 of the container riding upon the hollow tube 14 and it is desired to elevate the side arm 16 from the position shown in solid lines in FIGURE 2 to the chain line position at the upper end of FIGURE 2, a pneumatic valve 20 connected to a source of low pressure air by means of a hose 21 is urged into sealed relationship with the atmosphere opening 17 by a ram 22 actuated by a cylinder 23 connected to a higher pressure source of air 24. The ram 22 of the cylinder 23 has a throw or travel distance to the point shown in dotted lines in FIGURE 2, at which time the hollow article on rising would be at Station E of FIGURE 1, the solid line position of FIGURE 2 denoting Station C.

Once the vacuum has been broken inside the hollow article 10 and the ram 22 has travelled its maximum distance the work carrier arm 16 will continue to rise to the chain line position shown in FIGURE 2 leaving the atmosphere opening 17 in the open position to permit the air to enter the hollow article and replace the solution being discharged through the mouth of the article incident to its vertical removal from the solution as at Station F in FIGURE 1.

Figure 3:
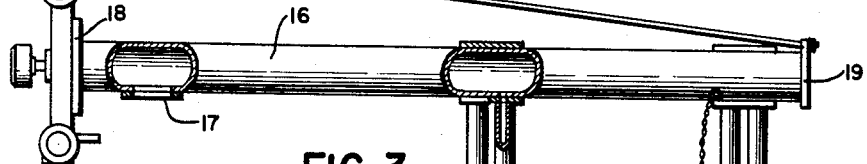
FIGURE 3 is a side elevational view of a work carrier arm and work carrier constructed in accordance with the present invention.

As best seen in FIGURE 3 the side arm 16 has two sets of hollow article carrier or support rack members 13, 14 from which it will be noted that clips or guides 13$^a$ are provided for steadying the hollow articles on the shorter inverted tubular members 14.

Figure 5:
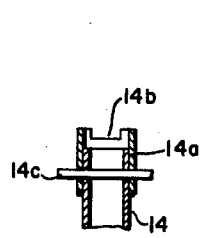
FIGURE 5 is an enlarged sectional view of the hollow article bottom support member.

As shown in FIGURE 5 the upper end of the hollow article support member 14 is provided with a cap member 14$^a$ having undercut portions 14$^b$ to permit air to enter or leave the tube 14 when the bottom 11 of the hollow article 10 is resting thereupon.

Figure 6:
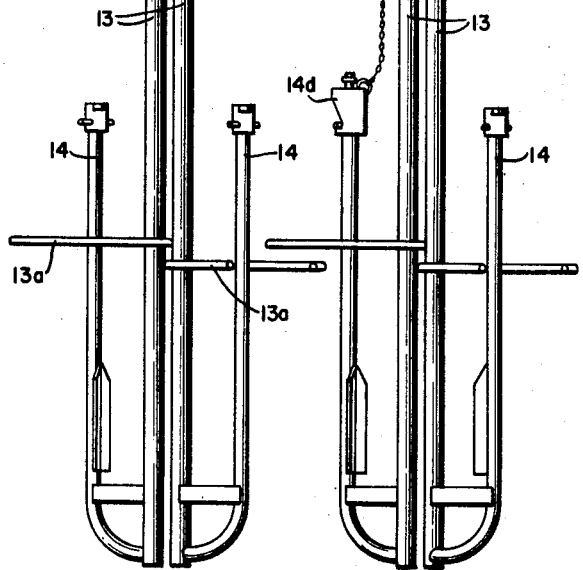
FIGURE 6 is a sectional view of a form of cap or seal employed with FIGURE 5.

As shown in FIGURE 6 a pin 14$^c$ is provided which mates with an inverted serrated cap 14$^d$ which carries a spring loaded valve member 14$^e$ for closing the end of a tubular member 14 upon which a hollow article is not placed to avoid blowing solution out of the acid treatment tank when the low pressure air is applied to the hollow carrier arm 16. This cap 14$^d$ also prohibits entry of solution into the U-shaped arms 13, 14 when the work carrying arm 16 is in its lowermost position and a hollow article is fully immersed in a treatment tank as at Station C in FIGURE 1.

In FIGURE 7 a conventional return type continuous treatment machine is shown having treatment tanks 25 containing treatment solutions 15 and in which the center frame of the machine carries guides 26 within which the side arms 16 are raised and lowered for introducing the hollow articles into and out of treatment tanks.

These arms are raised by an elevator mechanism 27 and a conveyor of known type advances the arms 16 from one station to another horizontally when the arms 16 are in the raised position.

As shown also in FIGURE 7 the machine frame center portion supports the pneumatic valve cylinder 23 for moving the pneumatic valve 20 into position against the opening 17 in the side arms as described hereinabove. There will be a cylinder 23, ram 22 and pneumatic valve 20 connected to a low pressure source of air 21 at each treatment station where the side arms are required to raise and the same will be employed whenever the hollow articles 10 are raised from the in-tank or treatment position to the elevated position. The valve 20 may be an individual valve for each side arm or the valve 20 may be charged from a common manifold, the low pressure supply of which is controlled by a single valve the opening and closing of which will be synchronized through an elevator control switch.

In operation, referring to FIGURES 2 and 3, inverted hollow articles 10 will be racked upon the side arms 16 by inverting the hollow article 10 and placing it over the tubular member 14 in such a manner that the inside of the bottom 11 of the hollow article 10 will ride upon the cap member 14$^a$ so that a passage of air will exist from the mouth 12 of the container through the opening 14$^b$ down the tube 14 to the tube 13 thence through the hollow side arm 16 and through the opening 17 to atmosphere. The racked side arm containing the hollow articles to be treated will then assume the position shown in FIGURE 7. When the elevator 27 lowers the side arm 16 carrying the articles 10 into the treatment tank as the solution enters the mouth 12 of the hollow article the air entrapped in the hollow article as shown at Station A of FIGURE 1 will escape from the container via the route described above and the arm 16 will continue to its fully lowered position as depicted in solid lines in FIGURE 2. When the arm 16 is in the fully lowered position and about to raise a switch will close causing the ram 22 to urge the pneumatic valve 20 into sealed mating engagement with the opening 17 in the hollow side arm 16.

When the treatment cycle has timed out and the elevator is energized and commences to rise lifting the side arm 16, the ram 22 will likewise extend keeping the pneumatic valve 20 tightly against the opening 17 and the pneumatic valve 20 will be opened thus passing low pressure air from a common source such as a compressor or air reservoir from 21 through valve 20 through opening 17 in the hollow arm and thence down through the tubular member 13 and up the tubular member 14 as shown at Station E in FIGURE 1 to commence expelling the liquid from within the hollow article as the article is being simultaneously raised by the elevator.

After the elevator has caused the arm 16 to reach the position shown in dotted lines in FIGURE 2 the ram 22 will have travelled its maximum distance and the opening 17 in the hollow arm 16 will then be vented to atmosphere and the two positions shown at Station F in FIGURE 1, that is, the solid line position and the dotted line position will then be achieved.

When this cycle has been completed, the horizontal conveyor of the machine will then advance the side arm 16 carrying for example four inverted hollow articles 10 to a subsequent treatment station.

All treatment stations into which hollow articles 10 in an inverted position are introduced will cause the machine to be operated in the manner described hereinabove and therefore detail has been described for one station only.

Although we have disclosed herein the best form of the invention known to us at this time, we reserve the right to all such modifications and changes as may come within the scope of the following claim.

What we claim is:

The method of treating an inverted hollow article having one closed end in successive seriatim solutions consisting in (a) introducing the open end of the hollow article into the solution with the major axis of the article normal to the plane of the solution, (b) venting off the air entrapped in the hollow article as it is immersed down into the solution, (c) replacing the entrapped air with treating solution and upon completion of the treatment (d) raising the hollow article vertically and (e) injecting a pulse of low pressure air slightly in excess of atmospheric pressure to break the vacuum pull of the solution within the container to permit the treatment solution to freely leave the hollow article in a smooth even flow as the hollow article is raised from the solution.

References Cited in the file of this patent

UNITED STATES PATENTS

| | | |
|---|---|---|
| 733,972 | Kennedy | July 21, 1903 |
| 1,875,819 | Naruse | Sept. 6, 1932 |
| 2,078,860 | Landis | Apr. 27, 1937 |